US010067599B2

(12) United States Patent
Colville

(10) Patent No.: US 10,067,599 B2
(45) Date of Patent: Sep. 4, 2018

(54) TOUCHSCREEN DEFROSTER

(71) Applicant: NCR Corporation, Duluth, GA (US)

(72) Inventor: James Joseph Colville, Dundee (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/223,719

(22) Filed: Jul. 29, 2016

(65) Prior Publication Data

US 2018/0032199 A1 Feb. 1, 2018

(51) Int. Cl.
G06F 3/044 (2006.01)
G06F 3/041 (2006.01)
B05D 7/00 (2006.01)

(52) U.S. Cl.
CPC ............. G06F 3/0416 (2013.01); B05D 7/50 (2013.01); G06F 3/044 (2013.01); G06F 3/0412 (2013.01)

(58) Field of Classification Search
CPC ...... G06F 3/0416; G06F 3/044; G06F 3/0412; B05D 7/50
See application file for complete search history.

(56) References Cited

U.S. PATENT DOCUMENTS

| 6,089,751 A * | 7/2000 | Conover ........... G02F 1/133382 219/209 |
| 2002/0089638 A1* | 7/2002 | Ho ................... G02F 1/133382 349/161 |
| 2011/0015889 A1* | 1/2011 | Land .................... G06F 3/0418 702/104 |
| 2012/0072157 A1* | 3/2012 | Alameh ................. G01K 13/00 702/99 |
| 2015/0062093 A1* | 3/2015 | Ksondzyk ............... G06F 3/044 345/178 |
| 2015/0219935 A1* | 8/2015 | Guzzon ................... G02F 1/011 385/3 |
| 2015/0227241 A1* | 8/2015 | Atkinson ................ G06F 3/044 345/174 |
| 2015/0253890 A1* | 9/2015 | Sobel .................... G06F 3/0416 345/173 |
| 2016/0147357 A1* | 5/2016 | Ye ........................ G06F 3/0416 345/173 |
| 2016/0302331 A1* | 10/2016 | Dunn ................. H05K 7/20972 |
| 2017/0090659 A1* | 3/2017 | Shiozaki ............... G06F 1/1652 |
| 2017/0098424 A1* | 4/2017 | Nam ........................ G01K 1/20 |
| 2017/0177109 A1* | 6/2017 | Polishchuk ............. G06F 3/044 |

(Continued)

FOREIGN PATENT DOCUMENTS

| EP | 2286992 A1 | 2/2011 |
| KR | 101007248 B1 | 1/2011 |
| WO | 2015/083424 A1 | 6/2015 |

OTHER PUBLICATIONS

European Search Report dated Dec. 5, 2017 in copending European Patent Application No. 171873086.2.

Primary Examiner — Premal R Patel
(74) Attorney, Agent, or Firm — Schwegman, Lundberg & Woessner

(57) ABSTRACT

Disclosed is a touchscreen. The touchscreen can include a base material, a first coating, and a controller. The first coating can be applied to the base material. The first coating can be configured to generate an input signal. The controller can be configured to apply a base signal to the first coating, and filter the input signal from a combined signal. The combined signal can include the input signal and the base signal.

13 Claims, 3 Drawing Sheets

(56) References Cited

U.S. PATENT DOCUMENTS

2017/0177138 A1* 6/2017 Orlovsky .............. G06F 3/0416
2017/0212617 A1* 7/2017 Yuan ....................... G06F 3/044
2017/0214897 A1* 7/2017 Kado ................... H04N 9/3194
2017/0255327 A1* 9/2017 Simmons .............. G06F 3/0418

* cited by examiner

TOUCHSCREEN DEFROSTER

BACKGROUND

Service terminals have become ubiquitous within the retail environment. At the retail level, service terminals can include self-service terminals (SST) and cashier service terminals. Service terminals allow customers to quickly checkout by allowing the customer or a cashier to scan items having a barcode. The items are scanned by moving items quickly over a scanner.

SUMMARY

Disclosed is a touchscreen. The touchscreen can include a base material, a first coating, and a controller. The first coating can be applied to the base material. The first coating can be configured to generate an input signal. The controller can be configured to apply a base signal to the first coating, and filter the input signal from a combined signal. The combined signal can include the input signal and the base signal.

BRIEF DESCRIPTION OF THE FIGURES

The above-mentioned and other features and advantages disclosed herein, and the manner of attaining them, will become more apparent and the disclosure itself will be better understood by reference to the following description of embodiments taken in conjunction with the accompanying drawings, wherein.

Corresponding reference characters indicate corresponding parts throughout the several views. The exemplifications set out herein illustrate embodiments, and such examples are not to be construed as limiting the scope of the appended claims any manner.

DETAILED DESCRIPTION

Figure 1:
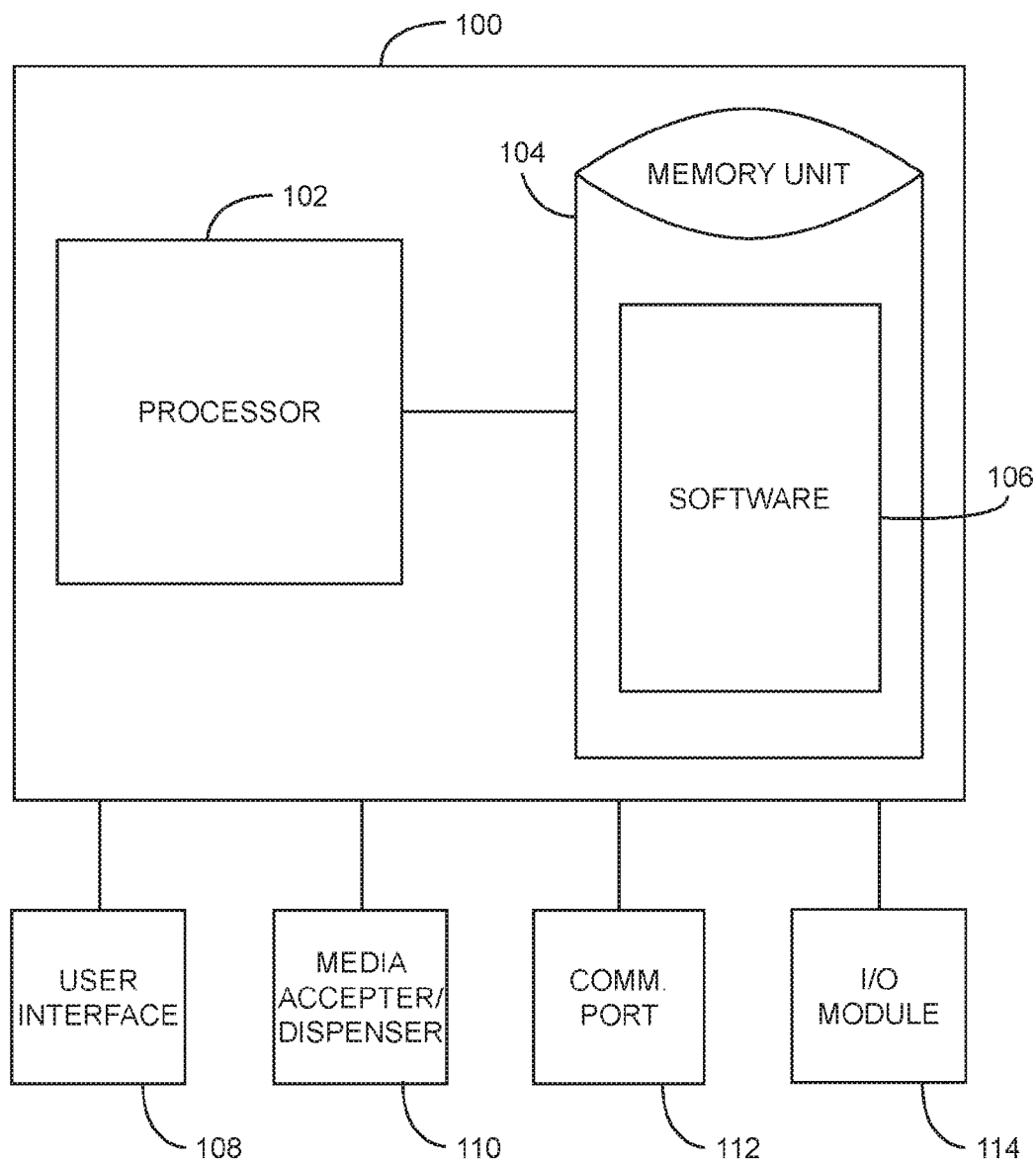
FIG. 1 shows a perspective view of a service terminal according to an example embodiment.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit the disclosure. Instead, the proper scope of any invention disclosed herein is defined by the appended claims.

Service terminals can be located in a variety of environments. For example, service terminals can be located inside or outside buildings. In addition, a portion of a service terminal can be located inside a building and another portion of the service terminal can be located inside the building. For instance, a service terminal, such as an automated teller machine, can have a touchscreen and media accepter/dispenser that is located outside a bank and the media storage or other valuable storage can be located inside the bank.

Due to the temperature difference between the inside of the service terminal and outside of the building, frost can form on the touchscreen. For example, air inside the service terminal can be warm and humid. As that air contacts components of the touchscreen that are cool due to being exposed to outside ambient air, the humidity in the air can condense and form frost.

To combat the frost, a base material of a touchscreen can include a coating. A base current can be applied to the coating. As the base current flows through the coating, the coating and a portion of the base material can heat up. The heating of the coating and the portion of the base material can work to evaporate any condensation or melt any frost that may form on touchscreen.

During operation of the service terminal, a controller can apply the base current. In addition, the controller can receive a signal that can include input signals from the base as the user touches the base material and the base current. The controller can filter received signal into the input signals and the base current. By filtering the base current from the received signal, the controller can determine values for the input signals and determine where a user is touching the touchscreen.

Turning now to the figures, FIG. 1 is a block diagram of a service terminal 100 according to an example embodiment. The service terminal 100 can include a processor 102 and a memory unit 104. The memory unit 104 may include software 106. While executing on the processor 102, the software 104 may perform processes for executing operating the service terminal 100, including, for example, one or more stages included in method 300 described below with respect to FIG. 3.

The self-service terminal 100 may also include a user interface 108. The user interface 108 may include any number of devices that allow a user to interface with the self-service terminal 100. Non-limiting examples of the user interface 112 include a keypad, a microphone, a speaker, a touchscreen, etc.

The self-service terminal 100 may also include a media acceptor/dispenser 110. The media acceptor/dispenser 100 may include any number of devices that allow a user to insert media into or receive media from the self-service terminal 100. The media acceptor/dispenser 110 may be a single unit that performs both functions of accepting and dispensing media or the media acceptor/dispenser 110 may be multiple units. Each of the multiple units may perform a single function. For example, a first unit may accept media and a second unit may dispense media.

The self-service terminal 100 may also include a communications port 112. The communications port 112 may allow the self-service terminal 100 to communicate with information systems, remote servers, other self-service terminals, etc. Non-limiting examples of the communications port 112 include, Ethernet cards (wireless or wired), Bluetooth® transmitters and receivers, near-field communications modules, etc.

The self-service terminal 100 may also include an input/output (I/O) device 114. The I/O device 114 may allow the self-service terminal 100 to receive and output information. Non-limiting examples of the I/O device 114 include, a camera (still or video), a printer, a scanner, a touchscreen, etc.

Figure 2:
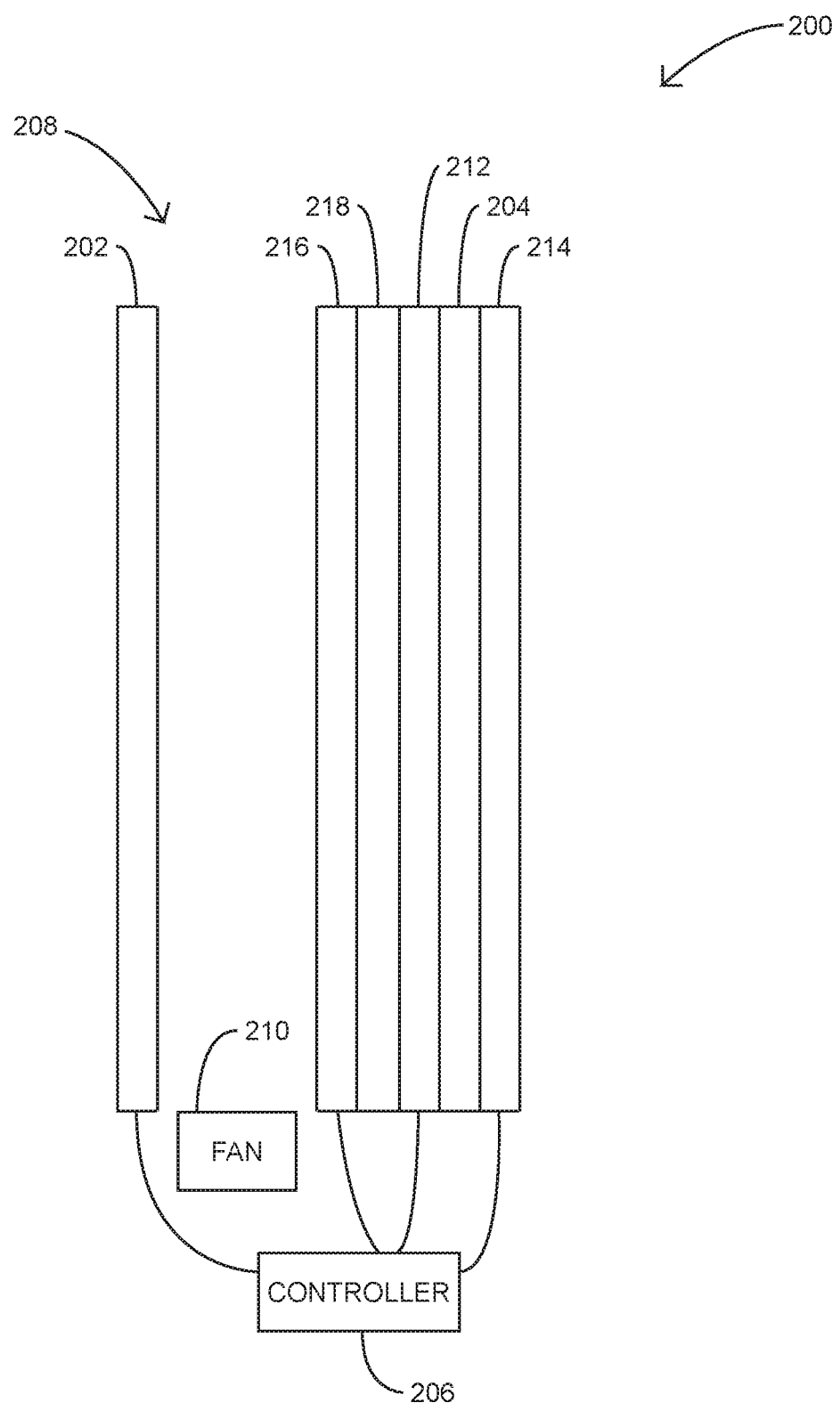
FIG. 2 shows a touchscreen according to an example embodiment.

FIG. 2 shows a touchscreen 200 according to an example embodiment. The touchscreen 200 can be a component of the service terminal 100. For example, the touchscreen 200 can be a component of the user interface 108 or the I/O module 114.

The touchscreen 200 can include a display 202, base 204, and a controller 206. The display 202 and the base 204 can be spaced a distance apart to form a channel 208. A fan 210 can be located proximate the channel 208 and arranged to direct air through the channel 208. The airflow can be used to assist in cooling the display and remove moisture that may accumulate proximate the display 202 and the base 204. The distance between the display 202 and the base 204 can range from about 5 mm to about 15 mm.

The base 204 can act as a protector of the display 202. For example, the base 204 can be a piece of glass with which a user can touch and interact. The base 204 can be arranged parallel to the display 202 or at an angle.

The base 204 can include a first coating 212, a second coating 214, and a third coating 216 (collectively the coatings). The coatings can be any electrically conductive material. For example, the coatings can be indium tin oxide. In addition, any of the coatings can be located on any side of the base 204. In addition, any of the coatings can be located on the same side of the base 204. For example, as shown in FIG. 2, the first coating 212 and the third coating 216 can located on a first side of the base 204 and separated by an insulator 218. The insulator 218 can allow different currents to be applied to the different coatings. For example, a first current can be applied to the third coating 216 and a second current can be applied to the first coating 212.

During use, one of the coatings can generate a signal that corresponds to an input from a user. For example, the touchscreen 200 can be a capacitance touchscreen and when a user touches the base 204 a capacitance change. The capacitance change can be detected by the controller 206.

The controller 206 also can generate and receive other signals. For example, the controller 206 can be in electrical communication with the display 202, the first coating 212, the second coating 214, and the third coating 216. The controller 206 can receive the input signal, registered as a capacitance change detected by a voltage or current change. The controller 206 can also generate a voltage or current that can be transmitted to one of the coatings that can be used to detect the capacitance change.

As used herein, signal, current, and voltage can be used interchangeable. For example, the controller 206 can generate or receive signals. Those signals can be in the form of a voltage or a current. A current can be related to a voltage or resistance via Ohm's law.

The base current that is needed to heat the base to remove or hinder the formation of frost on the touchscreen 206 can vary. For example, the amount of heat needed can vary depending on the ambient temperature. As a result, the base current can vary depending on the ambient temperature. The controller 206 can receive ambient temperature readings using the I/O module 114. For instance, the I/O module 114 can include thermal couples or other temperature sensors. The base current can also be related to the size of the base 204. For example, a larger base may require a larger base current than a smaller base.

The controller 206 can be the processor 102 or a stand along component. For example, the controller 206 can be the processor 102 and the method 300 can be carried out via software 106. In addition, the controller 206 can be a standalone processor and firmware used to execute the method 300.

Figure 3:
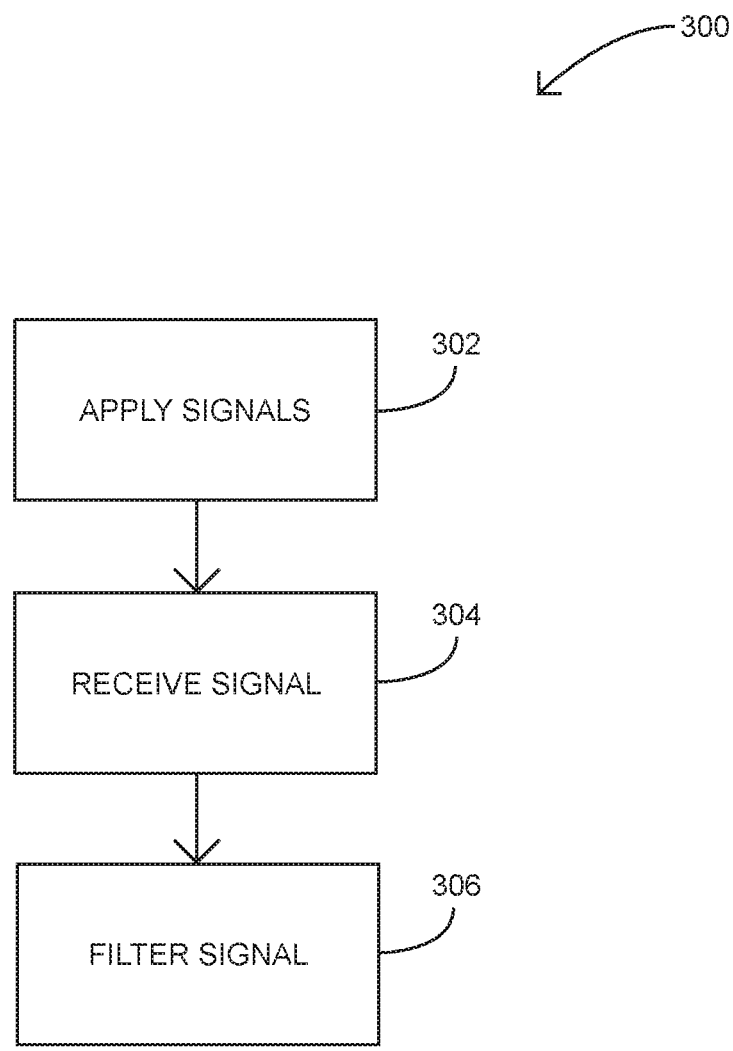
FIG. 3 shows an example method according to an example embodiment.

FIG. 3 shows a method 300 for defrosting a touchscreen, such as the touchscreen 200, according to an example embodiment. The method 300 can start at stage 302 were a base signal can be applied to a first coating (e.g., the first coating 212). The base signal can also be applied to a second coating (e.g., the second coating 214 or the third coating 216).

In stage 302 more than one signal can be applied. For example, a first signal could be sent to a first coating and a s second signal can be sent to a second coating. The first signal can be the base signal used to heat the touchscreen. The second signal can be used to measure a capacitance change when a user touches the touchscreen.

The first signal and the second signal can be applied to a signal coating. For example, a first signal can be the base signal and the second signal can be used to measure a capacitance change when a user touches the touchscreen. To apply more than one signal to a single conductive coating, the various signals can be modulated by the controller reduce interference between the signals.

From stage 302, the method 300 can proceed to stage 304 where a signal can be received. For example, a signal that represents a capacitance change can be received at the controller. The signal can be in the form of a combined signal or multiple signals. For example, a combined signal that includes the base signal and the signal corresponding to a capacitance change can be received at the controller. The received signal can be a modulated signal.

From stage 304, the method 300 can proceed to stage 306 where the received signal can be filtered. For example, the controller can demodulate a modulated signal. In addition, filters such as low-pass, high-pass, and band-pass filters can be used to filter the received signal into the base signal and an input signal. The filtering of the signal can allow the controller to correlate the input signal to an input location. The input location can correspond to a location on the touchscreen that was touched by a user.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A touchscreen comprising:
   a base material having a first base side and a second base side;
   a first coating applied to the first base side of the base material, the first coating configured to generate an input signal;
   a second coating applied to the second base side of the base material;
   an insulator applied to the second coating;
   a third coating applied to the insulator, the insulator locating in between the second coating from the third coating; and
   a controller in electrical communication with the first, second, and third coatings, the controller configured to:
      apply a base signal to the second coating and the third coating, and
      receive a combined signal, the combined signal including the base signal and the input signal,
      filter the input signal from the combined signal.

2. The touchscreen of claim 1, wherein the first coating is indium tin oxide.

3. The touchscreen of claim 1, further comprising a display, the base material located proximate the display.

4. The touchscreen of claim 3, wherein the display and the base material form a channel, the touchscreen further comprising a fan arranged to move air within the channel.

5. The touchscreen of claim 1, wherein the base material is glass.

6. The touchscreen of claim 1, wherein applying the base signal includes the controller configured to adjust the base signal based on an ambient temperature.

7. A touchscreen comprising:
- a glass base having a surface area;
- a first coating applied to a first side of the glass base, the first coating configured to generate an input signal in response to a user touching the glass base;
- a second coating applied to a second side of the glass base;
- an insulator applied to the first coating;
- a third coating applied to the insulator; and
- a controller in electrical communication with the first, second, and third coatings, the controller configured to:
  - apply a base signal to the second and third coatings, the base signal being proportional to the surface area of the glass base,
  - receive a combined signal, the combined signal including the input signal and the base signal, and
  - filter the input signal from the combined signal.

8. The touchscreen of claim 7, wherein the first coating is indium tin oxide.

9. The touchscreen of claim 7, further comprising a display, the glass base located proximate the display.

10. The touchscreen of claim 9, wherein the display and the glass base form a channel, the touchscreen further comprising a fan arranged to move air within the channel.

11. The touchscreen of claim 7, wherein applying the base signal includes the controller configured to adjust the base signal based on an ambient temperature.

12. A service terminal comprising:
- a display;
- a base, the base located at an angle to and proximate the display;
- a first coating applied to a first side of the base, the first coating configured to generate a capacitance change in response to a user touching the base at an input location;
- a second coating applied to a second side of the base;
- a third coating applied to and separated from the first coating by an insulator; and
- a controller in electrical communication with the first, second, and third coatings, the controller configured to:
  - apply a base signal to the second coating and the third coating,
  - determine the capacitance change generated by the first coating in response to the user touching the base,
  - correlate the capacitance change and the base signal into an input signal corresponding to the input location.

13. The service terminal of claim 12, wherein the first coating and the second coating are each indium time oxide.

* * * * *